(12) United States Patent
Hehn et al.

(10) Patent No.: US 10,841,763 B2
(45) Date of Patent: Nov. 17, 2020

(54) CONFIGURABLE MESSAGE INTERFACE

(71) Applicant: Volkswagen Aktiengesellschaft, Wolfsburg (DE)

(72) Inventors: Thorsten Hehn, Ingolstadt (DE); Roman Alieiev, Stendal (DE); Teodor Buburuzan, Braunschweig (DE); Joakim Cerwall, Stockholm (SE); Ernst Zielinski, Bochum (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/406,225

(22) Filed: May 8, 2019

(65) Prior Publication Data

US 2019/0349731 A1    Nov. 14, 2019

(30) Foreign Application Priority Data

May 8, 2018 (EP) .................................... 18171316

(51) Int. Cl.
*H04W 4/46*    (2018.01)
*H04B 1/3827*  (2015.01)
*H04W 4/12*    (2009.01)

(52) U.S. Cl.
CPC ............ *H04W 4/46* (2018.02); *H04B 1/3827* (2013.01); *H04W 4/12* (2013.01)

(58) Field of Classification Search
CPC .......... H04W 4/12; H04W 15/41; H04W 4/46
(Continued)

(56) References Cited

U.S. PATENT DOCUMENTS

| 2011/0159845 | A1* | 6/2011 | Sanjeev | ............... | G01S 5/0027 |
| | | | | | 455/411 |
| 2014/0171021 | A1* | 6/2014 | Davis | ................... | H04M 15/41 |
| | | | | | 455/408 |

(Continued)

FOREIGN PATENT DOCUMENTS

| EP | 1630765 A1 | 3/2006 |
| WO | 2015/171904 A1 | 11/2015 |

(Continued)

OTHER PUBLICATIONS

Sheng-Tzong Cheng et al, "Adaptive Vehicle to Vehicle Heterogeneous Transmission in Cooperative Cognitive Network Vanets", International Journal of Innovative Computing, vol. 8, No. 2, Feb. 2012 ICIC International 2012, ISSN 1349-4198.

*Primary Examiner* — William D Cumming
(74) *Attorney, Agent, or Firm* — 2SPL Patent Attorneys PartG mbB; Kieran O'Leary

(57) ABSTRACT

Embodiments relate to a network component, an apparatus for configuring a message interface, a vehicle, a method and computer program for a network component, a method and computer program for configuring a message interface. A network component of a mobile communication system for configuring a message interface for direct communication between two or more mobile transceivers comprises one or more interfaces configured to communicate with the two or more mobile transceivers. The network component further comprises a control module configured to control the one or more interfaces. The control module is further configured to receive information on an application using direct communication between the two or more mobile transceivers, to receive information on communication capabilities of the two or more mobile transceivers, and to determine information on a message interface configuration based on the information on the application and based on the information (Continued)

on the communication capabilities of the two or more mobile transceivers. The control module is further configured to provide information on the message interface configuration to the two or more mobile transceivers.

15 Claims, 4 Drawing Sheets

(58) Field of Classification Search
USPC .................................. 455/408, 411, 452.1
See application file for complete search history.

(56) References Cited

U.S. PATENT DOCUMENTS

| | | | |
|---|---|---|---|
| 2015/0327028 A1* | 11/2015 | Zhang | H04W 4/46 455/452.1 |
| 2016/0303968 A1 | 10/2016 | Miller et al. | |
| 2018/0027600 A1 | 1/2018 | Lawlis et al. | |

FOREIGN PATENT DOCUMENTS

| | | |
|---|---|---|
| WO | 2015171904 A1 | 11/2015 |
| WO | 2017/197649 A1 | 11/2017 |

* cited by examiner

CONFIGURABLE MESSAGE INTERFACE

FIELD

The present invention relates to a network component, an apparatus for configuring a message interface, a vehicle, a method and a computer program for a network component, and a method and a computer program for configuring a message interface, more particularly, but not exclusively to a concept for dynamically configuring a message interface for direct communication between two or more mobile transceivers.

BACKGROUND

Automated or autonomous driving is a field of research and development. In order to allow coordination and communication between the vehicles interfaces for direct communication are defined. The third Generation Partnership Project (3GPP) specified certain mechanisms for direct communication between mobile transceivers, also referred to as device-to-device (D2D) communication. 3GPP also defined such mechanisms for inter-vehicular communication, which is also referred to as vehicle-to-vehicle (V2V) communication.

Document US 2018/027600A1 describes a concept for V2V, which allows private communication between vehicles using a key exchange procedure. Document US 2016/0303968 A1 describes a configurable interface between a vehicle and a user. Sheng-Tzon Cheng et al, "ADAPTIVE VEHICLE TO VEHICLE HETEROGENEOUS TRANSMISSION IN COOPERATIVE COGNITIVE NETWORK VANETS", International Journal of Innovative Computing, Volume 8, Number 2, February 2012 ICIC International 2012, ISSN 1349-4198, describes a V2V communication system as an active radio broadcast system to receive information of disseminated road congestion and accident in a real-time situation. V2V and vehicle-to-infrastructure (V2I) communication are developed based on the IEEE 802.11p technology, ad hoc principles, and wireless multi-hop techniques using geographical positions. Cognitive radio (CR) systems can dynamically access any available resources in radio spectrum in an opportunistic fashion. Simulation results indicate that, when vehicles are unable to communicate directly with other available network nodes, infrastructure or vehicles, relaying information may be crucial. CR system may provide an adaptive physical layer or radio interface processing.

Inter vehicular communication introduces a basis for different applications, which may use the exchange of sensor data, image or video data, telemetric data, voice data etc. Different applications may have different requirements with respect to quality of service parameters such as data rate and latency. Adjusting the radio interface in a CR system may allow adapting to different radio environments or radio standards. There is also a demand to adapt communication mechanisms from an application point of view.

An objective of embodiments can therefore be seen in the provision of an improved application interface. The independent claims provide an improved concept for an application interface.

SUMMARY

Embodiments are based on the finding that different applications have different requirements and conventional message interfaces are defined statically for various applications. Conventional interfaces are hence a compromise. It is a further finding that message interfaces can be made adaptive or can be dynamically configured in order to better meet requirements of a certain application in a mobile communication system. Moreover, it is a finding that in a communication network such interfaces may be negotiated between peer entities or determined by a higher level or a control entity and can then be correspondingly configured at the peer entities.

Embodiments provide a network component of a mobile communication system for configuring a message interface for direct communication between two or more mobile transceivers. The network component comprises one or more interfaces configured to communicate with the two or more mobile transceivers. The network component further comprises a control module configured to control the one or more interfaces. The control module is configured to receive information on an application, which uses direct communication between the two or more mobile transceivers. The control module is configured to receive information on communication capabilities of the two or more mobile transceivers. The control module is further configured to determine information on a message interface configuration based on the information on the application and based on the information on the communication capabilities of the two or more mobile transceivers. The control module is further configured to provide information on the message interface configuration to the two or more mobile transceivers. Embodiments may therewith enable dynamic and adaptive configuration of a message interface between two or more mobile transceivers of a mobile communication system.

Embodiments also provide an apparatus for configuring a message interface at a mobile transceiver of a mobile communication system for direct communication with another mobile transceiver. The apparatus comprises one or more interfaces configured to communicate with network components of a mobile communication system. The apparatus further comprises a control module configured to control the one or more interfaces. The control module is configured to provide information on an application using direct communication with the other mobile transceiver. The control module is configured to provide information on communication capabilities of the mobile transceiver. The control module is further configured to receive information on a message interface configuration from the network component. The control module is further configured to specify, setup or configure the message interface based on the information on the message interface configuration. Embodiments provide an adaptively or dynamically configurable message interface for a mobile transceiver. Such a mobile transceiver may be enabled to negotiate such a message interface based on its capabilities and application needs.

In embodiments, the two or more mobile transceivers may be registered in the same mobile communication system or they may be registered in different mobile communication systems. Intra- and inter-system dynamic message interfaces for direct communication may hence be enabled in embodiments based on the respective capabilities of the mobile transceivers and the respective application requirements. In further embodiments the two or more mobile transceivers may be comprised in two or more vehicles. Embodiments may hence enable dynamic message interface configuration for inter vehicular communication such as V2V. Furthermore, the control module is configured to determine information on an overall situation of the two or more vehicles on the road or in a traffic situation. At least some embodiments may enable further message interface adaption or dynamic configuration based on a traffic or road situations, for example, in dense traffic scenarios capacity limitations of the involved mobile communication systems for direct communication may be taken into account for message interface configurations.

At least in some embodiments the information on the communication capabilities of a mobile transceiver may comprise one or more elements of the group of information on communication hardware, information on a sensor set of the mobile transceiver, information on a driving capability of the mobile transceiver, and information on an application processing power of a mobile transceiver. Embodiments may enable message interface adaption based on multiple parameters of a mobile transceiver, some of which may be static for a mobile transceiver and others may change dynamically. The network component may, in some embodiments, be comprised in one of the two or more mobile transceivers. Embodiments may enable a dynamic message interface, which can be negotiated between two or more mobile transceivers. A mobile transceiver comprising the network component and/or the apparatus is hence another embodiment.

A further embodiment is a vehicle comprising the above network component and/or the apparatus. In further embodiments such a vehicle may be configured to negotiate the message interface with another vehicle. Moreover, in some embodiments such a vehicle may have multiple interfaces. For example, a vehicle may be configured to communicate with the other vehicle using a basic predefined interface and the message interface according to the above embodiments.

Another embodiment is a method for a network component of a mobile communication system for configuring a message interface for direct communication between two or more mobile transceivers. The method comprises receiving information on an application using direct communication between the two or more mobile transceivers. The method further comprises receiving information on communication capabilities of the two or more mobile transceivers. The method comprises determining information on a message protocol configuration based on the information on the application and based on the information on the communication capabilities of the two or more mobile transceivers. The method further comprises providing information on the message interface configuration to the two or more mobile transceivers.

Yet another embodiment is a method for configuring a message interface at a mobile transceiver of a mobile communication system for direct communication with another mobile transceiver. The method comprises providing information on an application, which uses direct communication with the other mobile transceiver, and providing information on communication capabilities of the mobile transceiver to a network component. The method further comprises receiving information on a message interface configuration from the network component, and configuring the message interface based on the information on the message interface configuration.

Another embodiment is a system comprising the above network component and apparatus. In an embodiment of a system method the above method steps may be carried out in a corresponding sequence.

A computer program having a program code for performing one or more of the methods described herein is a further embodiment. In other words, embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
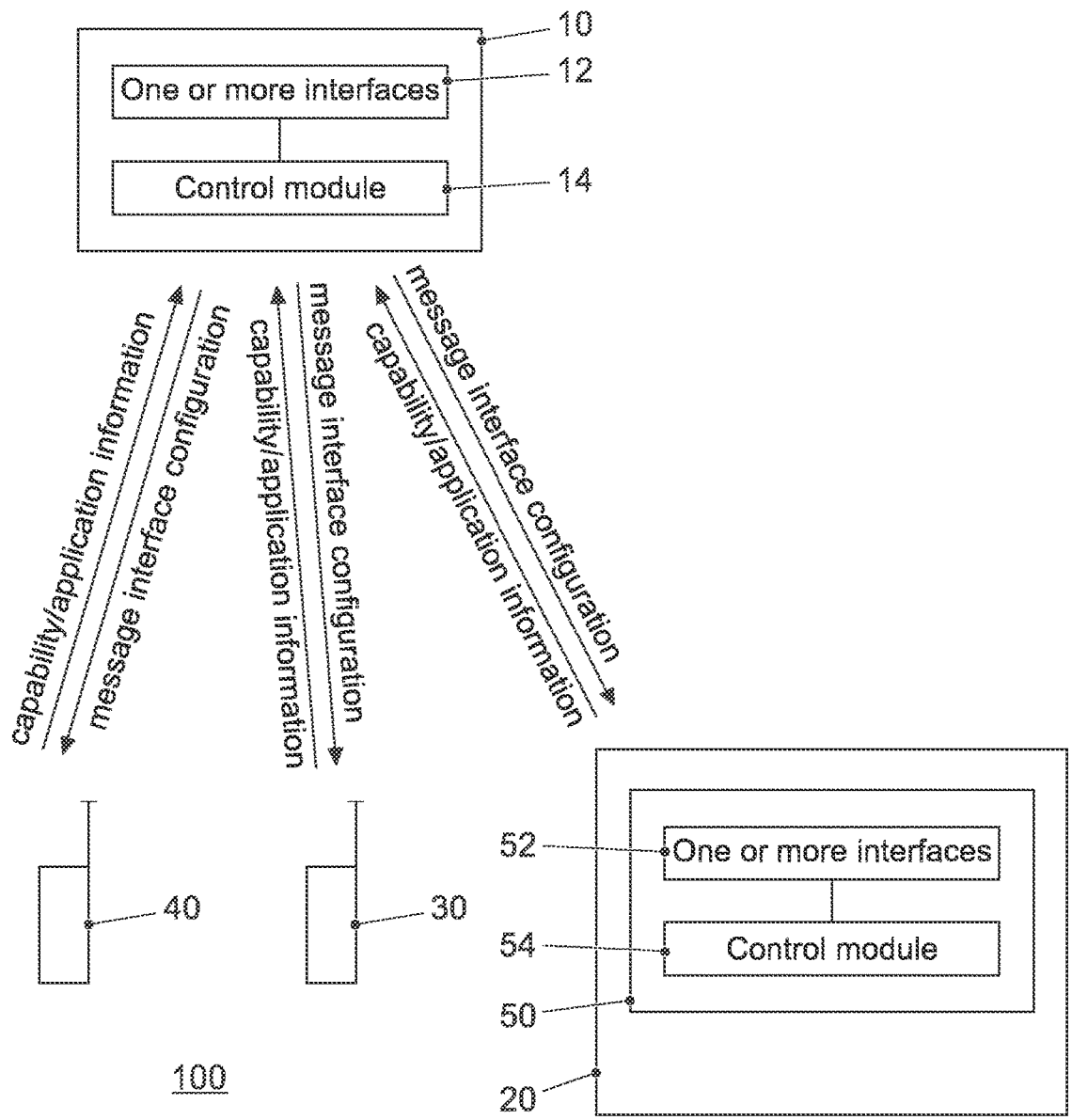
FIG. 1 illustrates an embodiment of network component, an embodiment of an apparatus for configuring a message, and an embodiment of a system.

FIG. 1 illustrates an embodiment of a network component 10 of a mobile communication system 100 for configuring a message interface for direct communication between two or more mobile transceivers 20, 30, 40. The network component 10 comprises one or more interfaces 12, which are configured to communicate with the two or more mobile transceivers 20, 30, 40. The network component 10 further comprises a control module 14, which is configured to control the one or more interfaces 12. The control module 14 is coupled to the one or more interfaces 12. The control module 14 is further configured to receive information on an application using direct communication between the two or more mobile transceivers 20, 30, 40, to receive information on communication capabilities of the two or more mobile transceivers 20, 30, 40, and to determine information on a message interface configuration based on the information on the application and based on the information on the communication capabilities of the two or more mobile transceivers 20, 30, 40. The control module is further configured to provide information on the message interface configuration to the two or more mobile transceivers 20, 30 40.

FIG. 1 also illustrates an embodiment of an apparatus 50 for configuring a message interface at a mobile transceiver 20 of the mobile communication system 100 for direct communication with another mobile transceiver 30, 40. The apparatus 50 comprises one or more interfaces 52 configured to communicate with network components 10, 30, 40 of the mobile communication system 100. The apparatus 50 comprises a control module 54 configured to control the one or more interfaces 52. The control module 54 is coupled to the one or more interfaces 52. The control module 54 is further configured to provide information on an application using direct communication with the other mobile transceiver 30, 40. The control module 54 is further configured to provide information on communication capabilities of the mobile transceiver 20, to receive information on a message interface configuration from the network component 10, and to configure the message interface based on the information on the message interface configuration.

In embodiments the one or more interfaces 12, 52, may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 12, 52 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12, 52 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12, 52 may serve the purpose of transmitting or receiving or both, transmitting and receiving, information, such as information related to capabilities, application requirements, message interface configurations, feedback, information related to control commands etc.

As shown in FIG. 1 the respective one or more interfaces 12, 52 are coupled to the respective control modules 14, 54 at the network component 10 and the apparatus 50. In embodiments the control modules 14, 54 may be implemented using one or more processing units, one or more processing devices, any means for processing, such as a processor, a computer or a programmable hardware component being operable with accordingly adapted software. In other words, the described functions of the control modules 14, 54 may as well be implemented in software, which is then executed on one or more programmable hardware components. Such hardware components may comprise a general purpose processor, a Digital Signal Processor (DSP), a micro-controller, etc.

FIG. 1 also shows an embodiment of a system 100 comprising an embodiment of the network component 10 and an apparatus 50. In embodiments, communication, i.e. transmission, reception or both, make take place among mobile transceivers 20, 30, 50 directly and/or between mobile transceivers 20, 30, 40 and the network component 10. Such communication may make use of a mobile communication system 100. In other words such communication may be carried out directly, e.g. by means of device-to-device (D2D) communication, which may also be referred to as vehicle-to-vehicle (V2V) communication in case the mobile transceivers 20, 30, 40 are implemented in vehicles as will be detailed subsequently. Such communication may be carried out using the specifications of a mobile communication system 100.

The mobile communication system 100 may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers 20, 30, 40 and a base station transceiver can be located in or adjacent to a coverage area of another base station transceiver, e.g. a macro cell base station transceiver or small cell base station transceiver. Hence, embodiments may provide a mobile communication system comprising one or more mobile transceivers 20, 30, 40 and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 20, 30, 40 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 20, 30, 40 may communicate directly with each other, i.e. without involving any base station transceiver, which is also referred to as Device-to-Device (D2D) communication. An example of D2D is direct communication between vehicles, also referred to as Vehicle-to-Vehicle communication (V2V). In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In embodiments the two or more mobile transceivers 20, 30, 40 as indicated by FIG. 1 may be registered in the same mobile communication system 100. In other embodiments one or more of the two or more mobile transceivers 20, 30, 40 may be registered in different mobile communication systems. The different mobile communication systems may use the same access technology but different operators or they may use different access technologies as outlined above. Moreover, in some embodiments the network component 10 can also be comprised in a mobile transceiver, for example, the network component may be comprised in one of the two or more mobile transceivers 20, 30, 40. In other embodiments, the network component can be located in a wired part of the network, e.g. at a base station transceiver or any other network node, e.g. a backend server, a cloud server or any other sever. As already stated above, the two or more mobile transceivers 20, 30, 40 may be comprised in two or more vehicles. Hence, the message interface may be dynamically negotiated or configured between vehicles controlled by the network component 10, which may be located in a covering network or also in a vehicle.

Another embodiment is a dynamic multi-tier interface for V2V. In this context multi-tier means that there may be multiple interfaces. At least one of the multiple interfaces corresponds to an embodiment of a configurable message interface as specified herein. As will be further detailed subsequently, embodiments may provide a method to define interfaces for vehicle-to-vehicle communication. This may allow for multi-tier interfaces that can offer additional functionality compared to the standardized interfaces. Additionally, the interfaces can be different depending on the situation, which is a dynamic feature.

Some V2X interfaces are standardized. This means that there exists a standardization body which defines all messages and possible message sequences that can be exchanged over the interface. This asserts that all vehicles can understand all other vehicles. Usually, all car manufacturers contribute to a standard to gain this level of interoperability. In addition vendor-specific interfaces may allow for additional functionality.

Embodiments may use a network connection and a backend server to dynamically negotiate interfaces for direct communication. Embodiments may allow negotiating multiple protocols which can be used simultaneously.

Figure 2:
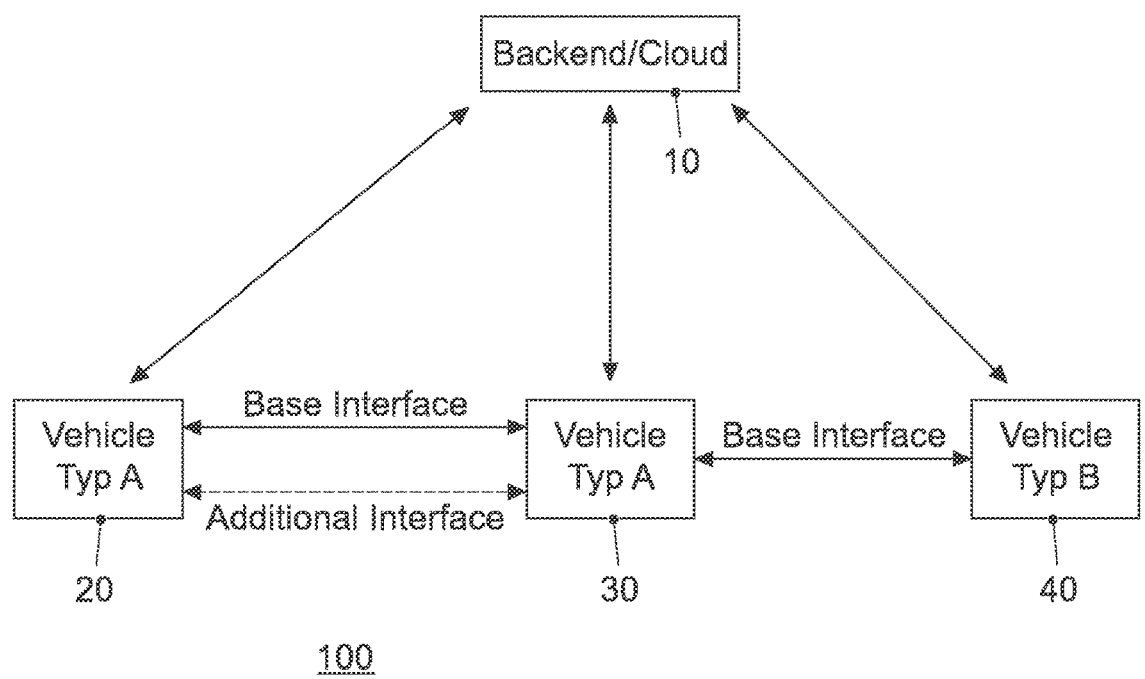
FIG. 2 shows a block diagram of an embodiment of a system comprising a backend server and multiple vehicles.

FIG. 2 shows a block diagram of an embodiment of a system 10 comprising a backend server 10 and multiple vehicles 20, 30, 40. In other words, FIG. 2 shows a scenario in which a vehicle 20 of type A comprises an embodiment of the above apparatus 50 and a vehicle 30 of type A also comprises an embodiment of the apparatus 50. Vehicles 20 and 30 further use a base interface for communicating directly with each other (V2V). In addition a dynamic interface according to an embodiment is configured between vehicles 20 and 30. Vehicle 30 uses the base interface also for communicating with another vehicle 40 of type B. An embodiment of the above described network component 10 is implemented at a backend or cloud server, which communicates with the vehicles 20, 30, 40 using a mobile communication system (V2I) in this embodiment.

The dynamic interface will be determined by all three contributing parties: vehicles 20, 30 of the vendor/owner A, vehicles 30 of the vendor/owner B and the common backend server 10. In this embodiment each vehicle 20, 30, 40 contributes some information about its capabilities. The information on the communication capabilities of the mobile transceivers 20, 30, 40 (vehicles in this scenario) may comprise one or more elements of the group of information on communication hardware available at the mobile transceiver 20, 30, 40, e.g. which kind of communication modems are available (data rates, latency, bandwidth, frequency, etc.), information on a sensor set of the mobile transceiver 20, 30, 40 (cameras, radar, lidar (light/lazer detection and ranging, etc.), information on a driving capability of the mobile transceiver 20, 30, 40 (speed limits, routes, driving preferences etc.), and information on an application processing power of the mobile transceiver 20, 30, 40 (processing capacity, e.g. video processing capability). In other words, the vehicles may provide information to the network component 10, for example information on communications hardware available, a sensor set available, driving capability, application processing power, etc.

For example, each vehicle 20, 30, 40 contributes information on the applications it intends to run with a corresponding vendor/owner to the back end server 10. The backend server 10 may consider its resulting overview and information on the current situation on the road. The control module 14 of the network component or backend server 10 is configured to determine information on an overall situation of the two or more vehicles on the road or in a traffic situation. Based on this information a message interface configuration can be determined for direct communication between the vehicles 20, 30, 40.

The proceedings or method to negotiate the interface in this embodiment could look like this:

Vehicle 20 submits applications it wants to run with vehicle 30 to the backend server 10

Vehicle 30 submits applications it wants to run with vehicle 20 to the backend server 10

Vehicle 20 submits its capabilities to the backend server 10

Vehicle 30 submits its capabilities to the backend server 10

The backend server 10 adds its own input

Given all input, the backend server 10 creates the additional interface (determines an according message interface configuration)

The backend server 10 conveys the interface to the two vehicles 20, 30.

For example, the requested application may be a video service. Both vehicles 20, 30 request to exchange video data with each other. The backend server 10 can then determine, based on the information available, how such an interface can be configured. For example, how many video frames can be transmitted in a data packet, how video data is segmented, what is a supported video resolution etc. Such a message interface may be symmetric, i.e. both transmission directions (vehicle 20 to vehicle 30, and vehicle 30 to vehicle 20) have the very same interface definition. In other embodiments, the message interface may as well be asymmetric, e.g. different definitions may be used for different transmission directions. Such a situation may occur when the capabilities of the mobile transceivers 20, 30 are different. For example, different data rates may be used, different video resolutions, etc.

Another application may relate to a platoon of vehicles. A concept of dealing with high traffic loads is platooning, in which vehicles are grouped and which may allow making more efficient use of the road capacity. The groups of vehicles, also referred to as convoys or platoons, may be used to operate the vehicles in the platoon with a short distance or headway between the vehicles, as the vehicles within the platoon may react within a short time delay or simultaneously. This can be achieved by control mechanisms being active between the vehicles of the platoon. Vehicles of the platoon may exchange sensor data among each other using direct communication. The application interfaces or message interfaces used for this purpose can be defined based on the capabilities of the participating vehicles. E.g. different interfaces may be configured for different sensor sets at the vehicles. A heading vehicle may need/provide other information than a vehicle in the middle or at the tail end of the platoon. According to an embodiment the message interfaces can be dynamically adapted to the traffic situation, the capabilities of the participants, and the properties of the platoon, e.g. size, number of vehicles route, etc. For example, warning messages of an emergency break maneuver may be particularly provided to following vehicles at low latency, whereas the information on an emergency break maneuver may not be as delay critical for a vehicle driving ahead. Different interfaces can be configured for these scenarios.

In embodiments a format for the message interface configuration could be Abstract Syntax Notation One (ASN. 1), which is a description language for information elements and information structures.

In further embodiments negotiation of a proprietary protocol (message interface configuration) may be carried out without a common backend server. In such an embodiment the network component 10 may be implemented or comprised in a mobile transceiver or vehicle. For example, one vehicle may then assume or accept the role of a temporary server.

As outlined above, a vehicle may comprise an embodiment of the network component 10 and/or an embodiment of the apparatus 50. The vehicle may be configured to negotiate the message interface with another vehicle. As further shown in FIG. 2, an embodiment of a vehicle 30 may be configured to communicate with another vehicle 20, 40 using a basic predefined interface and the message interface.

The above embodiments have been outlined mainly with respect to V2V. Other embodiments relate to D2D, for example, a gaming or video applications executed on two mobile transceivers using D2D may use a configurable message interface according to an embodiment. Depending on the capabilities of the involved mobile transceivers different message interfaces may be configured to meet quality of service requirements of the applications.

Figure 3:
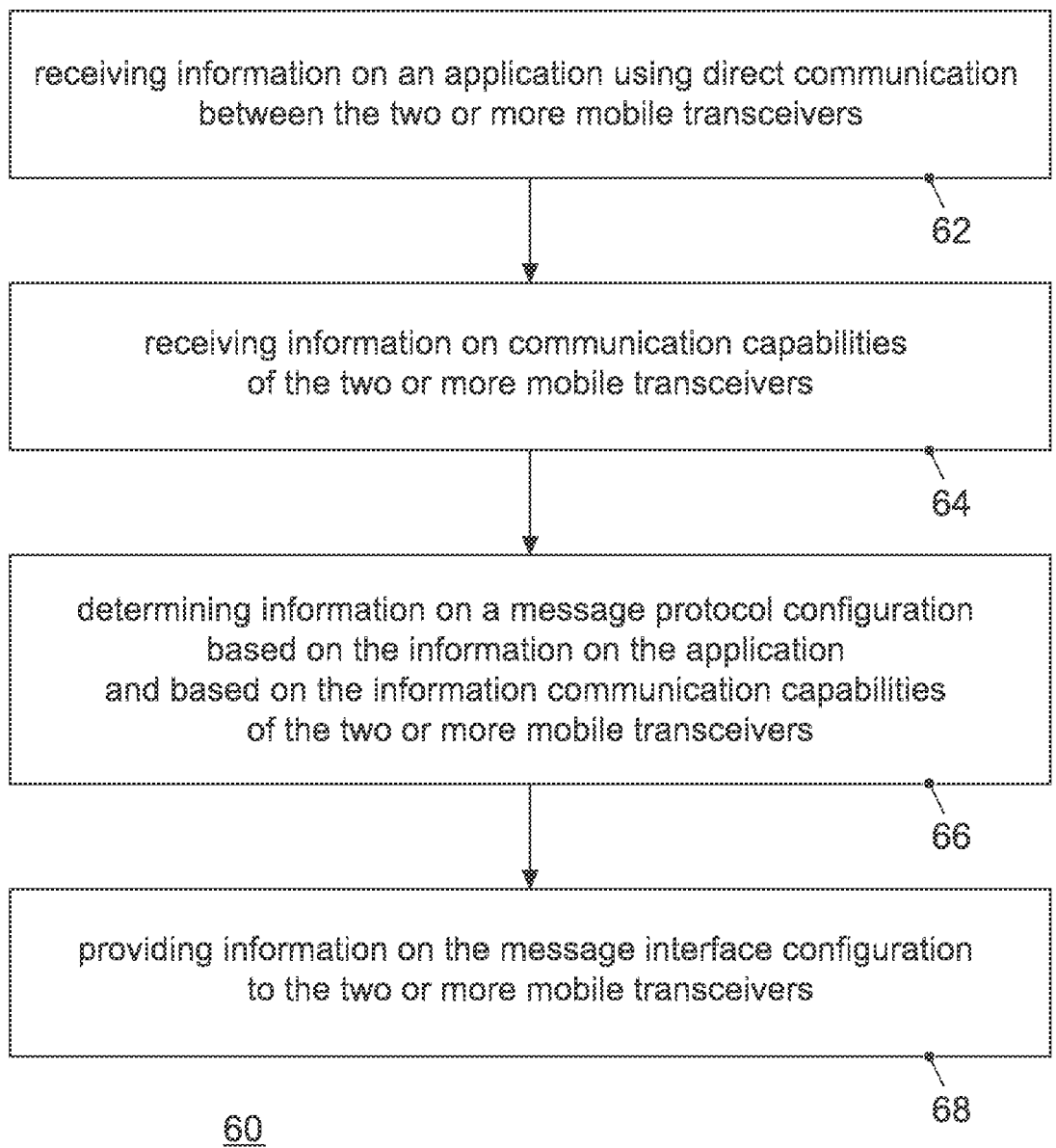
FIG. 3 shows a block diagram of an embodiment of a method for a network component.

FIG. 3 shows a block diagram of an embodiment of a method 60 for a network component 10 of a mobile communication system 100 for configuring a message interface for direct communication between two or more mobile transceivers 20, 30, 40. The method 60 comprises receiving 62 information on an application using direct communication between the two or more mobile transceivers 20, 30, 40. The method 60 further comprises receiving 64 information on communication capabilities of the two or more mobile transceivers 20, 30, 40. The method further comprises determining 66 information on a message protocol configuration based on the information on the application and based on the information on the communication capabilities of the two or more mobile transceivers 20, 30, 40. The method further comprises providing 68 information on the message interface configuration to the two or more mobile transceivers 20, 30, 40.

Figure 4:
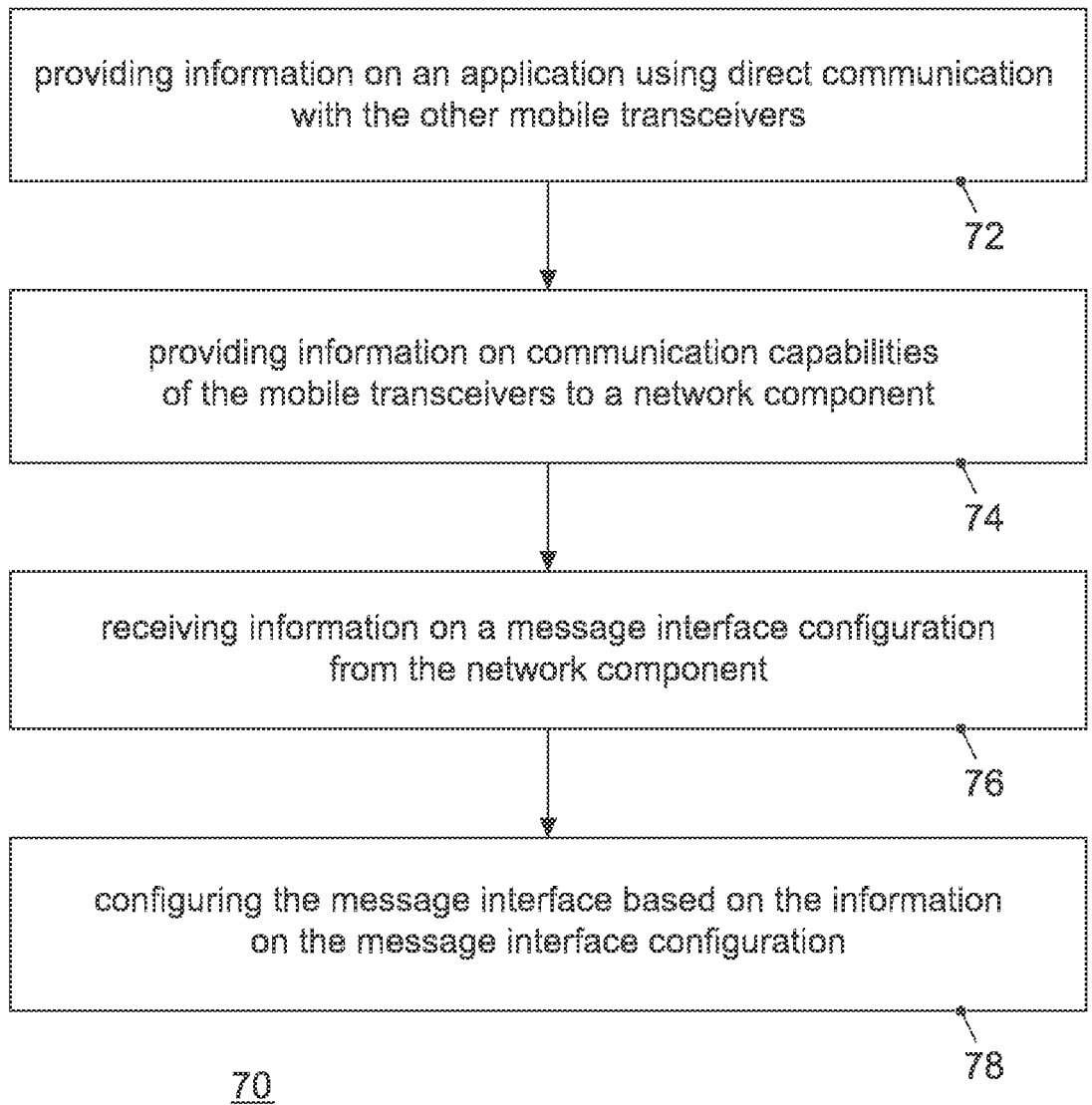
FIG. 4 shows a block diagram of an embodiment of a method for configuring a message interface at a mobile transceiver.

FIG. 4 shows a block diagram of an embodiment of a method 70 for configuring a message interface at a mobile transceiver 20 of a mobile communication system 100 for direct communication with another mobile transceiver 30, 40. The method 70 comprises providing 72 information on an application using direct communication with the other mobile transceiver 30, 40. The method further comprises providing 74 information on communication capabilities of the mobile transceiver 20 to a network component 10, and receiving 76 information on a message interface configuration from the network component 10. The method further comprises configuring 78 the message interface based on the information on the message interface configuration.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS 10 network component
12 one or more interfaces
14 control module
20 mobile transceiver
30 mobile transceiver
40 mobile transceiver
50 apparatus for configuring a message interface
52 one or more interfaces
54 control module
60 method for a network component
62 receiving information on an application using direct communication between the two or more mobile transceivers
64 receiving information on communication capabilities of the two or more mobile transceivers
66 determining information on a message protocol configuration based on the information on the application and based on the information on the communication capabilities of the two or more mobile transceivers
68 providing information on the message interface configuration to the two or more mobile transceivers
70 method for configuring a message interface at a mobile transceiver of a mobile communication system for direct communication with another mobile transceiver
72 providing information on an application using direct communication with the other mobile transceiver
74 providing information on communication capabilities of the mobile transceiver to a network component
76 receiving information on a message interface configuration from the network component
78 configuring the message interface based on the information on the message interface configuration
100 mobile communication system

What is claimed is:

1. A network component of a mobile communication system for configuring a message interface for direct communication between two or more vehicles, wherein a vehicle comprises user equipment, the network component comprising:
   one or more interfaces configured to communicate with the two or more user equipment; and
   a control module configured to control the one or more interfaces, wherein the control module is further configured to:
      receive information on an application, wherein the application uses direct communication between the two or more user equipment,
      receive information on communication capabilities of the two or more user equipment,
      negotiate and determine information on a message interface configuration based on the information on the application and based on the information on the communication capabilities of the two or user equipment, and provide negotiated information on the message interface configuration to the two or more user equipment.

2. The network component of claim 1, wherein the two or more user equipment are registered in the mobile communication system.

3. The network component of claim 1, wherein at least one of the two or more user equipment is registered in different mobile communication systems.

4. The network component claim 1, wherein the control module is configured to determine information on an overall situation of the two or more vehicles on the road or in a traffic situation.

5. The network component of claim 1, wherein information on the communication capabilities of the user equipment comprises one or more elements of the group of:
   information on communication hardware available at the user equipment,
   information on a sensor set of the user equipment,
   information on a driving capability of the vehicle comprising the user equipment, and
   information on an application processing power of the user equipment.

6. A user equipment of the two or user equipment comprising the network component.

7. An apparatus for configuring a message interface of a vehicle's user equipment in a mobile communication system for direct communication with another user equipment, the apparatus comprising:
   one or more interfaces configured to communicate with network components of the mobile communication system; and
   a control module configured to control the one or more interfaces, wherein the control module is further configured to:
      provide information on an application, wherein the application uses direct communication with the other user equipment,
      provide information on communication capabilities of the user equipment,
      receive negotiated information on a message interface configuration from the network component, and
      configure the message interface based on the negotiated information on the message interface configuration.

8. The apparatus of claim 7, wherein the information on the communication capabilities of the user equipment comprises one or more elements of the group of:
   information on communication hardware available at the vehicle,
   information on a sensor set of the user equipment,
   information on a driving capability of the vehicle comprising the user equipment, and
   information on an application processing power of the user equipment.

9. A vehicle comprising the network component of claim 1 and an apparatus for configuring a message interface at the vehicle of the mobile communication system for direct communication with another vehicle, the apparatus comprising:
   one or more interfaces configured to communicate with the network components of the mobile communication system; and
   a control module configured to control the one or more interfaces, wherein the control module is further configured to
      provide information on an application, wherein the application uses direct communication with the other vehicle,
      provide information on communication capabilities of the vehicle,
      receive information on a message interface configuration from the network component, and
      configure the message interface based on the information on the message interface configuration.

10. The vehicle of claim 9, wherein the apparatus is configured to communicate with the other vehicle using a basic predefined interface and the message interface.

11. A non-transitory machine readable medium including non-transitory code, when executed, to cause a machine to perform a method for a network component of a mobile communication system for configuring a message interface for between two or more vehicles, wherein a vehicle comprises user equipment, the method comprising: receiving information on an application, wherein the application uses direct communication between the two or more user equipment; receiving information on communication capabilities of the two or more user equipment; negotiating and determining information on a message protocol configuration based on the information on the application and based on the information on the communication capabilities of the two or more user equipment; and providing negotiated information on the message interface configuration to the two or more user equipment.

12. A non-transitory machine readable medium including non-transitory code, when executed, to cause a machine to perform a method for configuring a message interface of a vehicle's user equipment in a mobile communication system for direct communication with another user equipment, the method comprising:
   providing information on application, wherein the application uses direct communication with the other user equipment;
   providing information on communication capabilities of the user equipment to a network component;
   receiving negotiated information on a message interface configuration from the network component; and
   configuring the message interface based on the negotiated information on the message interface configuration.

13. A vehicle comprising the apparatus of claim 7.

14. The vehicle of claim 13, wherein the apparatus is configured to negotiate the message interface with another vehicle.

15. The vehicle of claim 14, wherein the apparatus is configured to communicate with the other vehicle using a basic predefined interface and the message interface.

* * * * *